Patented Oct. 27, 1953

2,657,215

UNITED STATES PATENT OFFICE 2,657,215

METHOD FOR THE PREPARATION OF NOVEL N-(2-CARBOXYALKYL) SUCCINIMIDES

Thomas H. Shelley, Spotswood, N. J., assignor to The B. F. Goodrich Company, New York, N. Y., a corporation of New York No Drawing. Application March 10, 1950,
Serial No. 149,011

3 Claims. (Cl. 260—326.3)

This invention relates to the preparation of novel N-(2-carboxyalkyl) succinimides, and pertains particularly to the preparation of such compounds by the reaction of beta-lactones with succinimide.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone), which has the formula

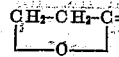

is economically obtained from ketene and formaldehyde.

I have now discovered that saturated aliphatic beta-lactones will react with salts of succinimide to form N-(2-carboxyalkyl) succinimides in excellent yields, which compounds have not been prepared heretofore. This reaction is believed to proceed substantially according to the following equation:

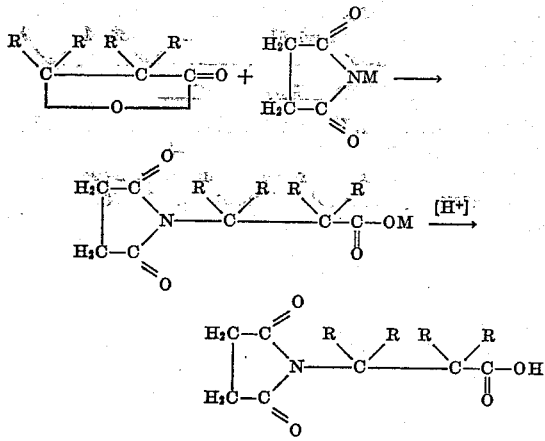

wherein each R is a member of the class consisting of hydrogen and lower alkyl radicals, and M is a salt-forming cation such as a metallic ion, sodium, potassium, ammonium or the like.

This reaction provides a convenient and economical method for preparing many novel and useful organic compounds which are especially valuable as medicinals, fungicides, insecticides and as a chemical intermediate in the preparation of other organic compounds such as esters and the like.

As disclosed hereinabove, the beta-lactones which are reacted with salts of succinimide in accordance with this invention are saturated aliphatic beta-lactones which possess the structure

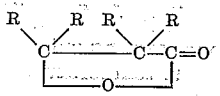

wherein each R is a member of the class consisting of hydrogen and lower alkyl radicals, preferably containing from 1 to 4 carbon atoms. Typical examples of such beta-lactones include, in addition to beta-propiolactone, beta-butyrolactone, beta-isobutyrolactone, beta-n-valerolactone, beta-isovalerolactone, beta-isopropyl-beta-propiolactone, beta-ethyl-beta-butyrolactone, alpha-methyl-beta-propiolactone, alpha,alpha-dimethyl-beta-propiolactone, alpha,beta-dimethyl-beta-propiolactone and the like. Especially preferred beta-lactones for use in this process are those which are water-soluble; beta-lactones containing 3 to 6 carbon atoms possess this property.

The reaction of this invention has been found to proceed quite readily without special conditions whenever the reactants are brought into efficient contact with one another. Since salts of succinimide are not appreciably soluble in beta-lactones, bringing together of the reactants is ordinarily accomplished by the use of a solvent in which the salt will dissolve and which will also dissolve the lactone. Since beta-lactones containing fewer than 7 carbon atoms and salts of succinimide are soluble in water, the carrying out of the reaction in aqueous solution is by far the most convenient method of procedure, although other solvents such as alcohols, ethers and the like may also be used effectively. It is to be understood, however, that the use of a solvent is not a critical expedient, for the reaction also proceeds quite readily in the absence of a solvent, that is, simply by admixing the two reactants.

Likewise, the reaction temperature is not critical and may be varied considerably. For example, the reaction will proceed satisfactorily at room temperature and such temperature is preferably used. However, higher temperatures, in the range of 30° C. to 100° C. or temperatures as low as 0° C. are also operative.

As indicated by the general equation set forth hereinabove, one mole of the succinimide salt is stoichiometrically required to react with one mole of beta-lactone to form an N-(2-carboxyalkyl) succinimide. However, a stoichiometric excess of the succinimide salt, for example from 2 to 5 moles for each mole of the beta-lactone may also be utilized, as may an excess of the beta-lactone, although the latter is not preferred, since appreciable polymerization of the beta-lactone may thereby be encountered.

Although the first-formed product of the reaction is a salt of the N-(2-carboxyalkyl) succinimide, the corresponding free acid is obtained on acidification of the reaction product. The salt formed on acidification is preferably removed by filtering and the free acid is obtained in the form of substantially pure, colorless crystals by recrystallization from a suitable solvent such as an alcohol or the like.

The more detailed practice of the invention is illustrated by the following example, wherein parts are given by weight. There are, of course, many other reaction procedures which are operative in addition to that of the specific example and which will be apparent to those skilled in the art.

EXAMPLE 121 parts (1 mole) of sodium succinimide are dissolved in 250 parts of water, and the resulting solution is cooled to a temperature of about 10° to 15° C. To this solution 72 parts (1 mole) of beta-propiolactone are added with stirring at such a rate that the temperature of the reaction mixture does not exceed 25° C. After addition of the beta-lactone is complete the reaction mixture is permitted to stand for about 15 minutes after which the reaction mixture is neutralized with hydrochloric acid. 150 parts of the water are then removed by vacuum distillation. 60 parts of concentrated hydrochloric acid are then added to the reaction mixture and the precipitate thus formed is removed by filtering. The precipitate is dried over calcium chloride and recrystallized three times from ethanol. 60 parts (35%) of N-(2-carboxyethyl) succinimide (M. P. 129° C. to 130° C.) are secured. The following analysis was obtained:

|  | Calculated | Found |
|---|---|---|
| Percent H | 5.26 | 5.38 |
| Percent C | 49.2 | 49.3 |
| Percent N | 8.24 | 8.1 |
| Mol. Wt | 171 | 174 |

When the above example is repeated utilizing other of the saturated aliphatic beta-lactones disclosed hereinabove, or other salts of succinimide, N-(2-carboxyalkyl) succinimides are obtained in good yields. Thus, for example, alpha-methyl-beta-propiolactone and potassium succinimide react as in the Example to form N-(2-carboxypropyl) succinimide; and beta-butyrolactone reacts with ammonium succinimide to form N-(2-carboxy-1-methylethyl) succinimide.

Numerous other variations and modifications in the procedure described herein will occur to those skilled in the art and are within the spirit and scope of the invention as defined in the appended claims.

I claim:

1. The method of preparing an N-(2-carboxyalkyl) succinimide which comprises bringing together a salt of succinimide with a beta-lactone of the structure

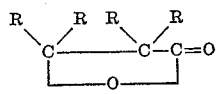

wherein each R is a member of the class consisting of hydrogen and lower alkyl radicals whereupon chemical reaction occurs between said salt of succinimide and said beta-lactone, and then acidifying the resulting reaction mixture.

2. The method of preparing N-(2-carboxyethyl) succinimide which comprises bringing together a salt of succinimide wtih beta-propiolactone, whereupon chemical reaction occurs between said salt of succinimide and said beta-propiolactone, and acidifying the resulting reaction mixture.

3. The method of preparing N-(2-carboxyethyl) succinimide which comprises bringing together in aqueous solution sodium succinimide and beta-propiolactone while maintaining the solution at about room temperature, whereupon chemical reaction occurs between said sodium succinimide and said beta-propiolactone, acidifying the resulting reaction mixture and separating said N-(2-carboxyethyl) succinimide from the acidified mixture.

THOMAS H. SHELLEY.

References Cited in the file of this patent

UNITED STATES PATENTS

| Number | Name | Date |
|---|---|---|
| 2,452,315 | Morgan et al. | Oct. 26, 1948 |
| 2,483,416 | Jansen et al. | Oct. 4, 1949 |
| 2,492,554 | Chodroff | Dec. 27, 1949 |

OTHER REFERENCES

Chem. Abst., vol. 17, p. 2868 citing Curtius et al., Jr. Prakt. Chem., vol. 105, pp. 289–313 (1923).

Beilstein, vol 21, Vierte Auflange, p. 378 citing Radenhausen, Jr. Prakt. Chem. (2) 2, vol. 52, p. 440.